United States Patent Office 3,692,613
Patented Sept. 19, 1972

3,692,613
APPARATUS FOR SEALING AND CUTTING
LAYERS OF THERMOPLASTIC FILM
Ronald E. Pederson, Kingston, Ontario, Canada, assignor to Du Pont of Canada, Limited, Montreal, Quebec, Canada
Filed May 18, 1971, Ser. No. 144,431
Claims priority, application Canada, June 10, 1970, 085,158
Int. Cl. B32b 31/00; B30b 15/34
U.S. Cl. 156—498
6 Claims

ABSTRACT OF THE DISCLOSURE

An improved electrical impulse sealer which is mounted in one of a pair of sealing jaws comprising a hollow metal tube extending beyond each end of the sealing jaw and adapted to convey a cooling fluid, two metal fins less than one-third the thickness of the tube wall and connected to the tube along the length of the sealing jaw, the fins projecting in opposite directions from the tube and being in substantially the same plane as the layers of film, the tube and fins being adapted to contact one of the layers of film when the sealing jaws are closed. This impulse sealer is particularly useful in sealing and simultaneously cutting through at least two layers of thermoplastic film moving intermittently in one plane such as that encountered in a liquid "form-and-fill" machine used to package low thermal conductive liquids such as oil or ethylene glycol.

BACKGROUND OF THE INVENTION

This invention relates to apparatus for sealing and simultaneously cutting through at least two layers of thermoplastic film.

The operation of sealing and simultaneously cutting through at least two layers of thermoplastic film has various applications. One such application is in closing and simultaneously separating the adjacent ends of thermoplastic film pouches being made and filled with a liquid on a so-called "liquid form-and-fill machine."

It is well known to package liquids, for example, milk, in thermoplastic film pouches on a form-and-fill machine. On these machines, a web of thermoplastic film is unwound from a roll, formed into a continuous tube on a tube-forming section and fed to a filling station. An initial cross-seal is made at the bottom of the tube below the filling station by a sealing device. Before the jaws of the sealing device are opened, sufficient liquid to fill one pouch is fed into the tube. The jaws are opened, the tube is advanced a preset distance, and then the same sealing device seals the top of the full pouch, forms the bottom of a new pouch and separates the full pouch from the tube, all in one operation.

The sealing device commonly used is a so-called "impulse sealer" in which an electrical current flows through the sealing element for only a fraction of the cycle time between operations. The impulse sealer may be a round wire (for example, a "piano" wire about 0.085 inch to a 0.09 which diameter) electrically insulated from a water-cooled supporting jaw. After the electrical impulse is fed to the impulse sealer, there is a cooling period in which the seals partially solidify before the sealing jaws are opened and the bottom seal supports the weight of the liquid in the pouch.

Round wire impulse sealers as described above are satisfactory for form-and-fill machines when packaging liquids such as milk, water or other highly aqueous products. These liquids have relatively high thermal conductivities and thus aid in cooling of the seal after the sealing jaws are opened, i.e., the cooling effect of the liquid on the seal operates before the weight of the liquid can weaken or rupture the bottom seal. These round wire impulse sealers are unsatisfactory on form-and-fill machines when packaging liquids such as ethylene glycol or oil (for automobile engines) because these liquids, having low thermal conductivities, do not aid in cooling the seal and hence the bottom seal of the pouch tends to stretch and leak after the sealing jaws are opened.

An attempt to overcome the above problem by increasing the cooling period of the cycle was unsuccessful because with the longer cooling period no cut-off of one pouch from the next was achieved. Another attempt to solve the problem by substituting a different type of impulse sealer (i.e., a hollow wire being cooled by a fluid passing through it) for the round wire was also unsuccessful, although some improvement was noted.

Therefore, it is desirable to provide an improved electrical impulse sealed which will overcome the above problem.

SUMMARY OF THE INVENTION

Accordingly, the present invention provides an apparatus for sealing and simultaneously cutting through at least two layers of thermoplastic film moving intermittently in one plane, the apparatus including a pair of sealing jaws and means for closing the jaws, the improvement of an electrical impulse sealer mounted in one of the jaws comprising a hollow metal tube extending beyond each end of the sealing jaw and adapted to convey a cooling fluid, two metal fins connected to the tube along the length of the sealing jaw, the fins projecting in opposite directions from the tube and being in substantially the same plane as the layers of film, the thickness of the fins being less than one-third of the wall thickness of the tube, the tube and the fins adapted to contact one of the layers of film when the sealing jaws are closed.

BRIEF DESCRIPTION OF THE DRAWING

An embodiment of the invention is illustrated in the accompanying drawings wherein.

DETAILED DESCRIPTION OF THE INVENTION

Figure 1:
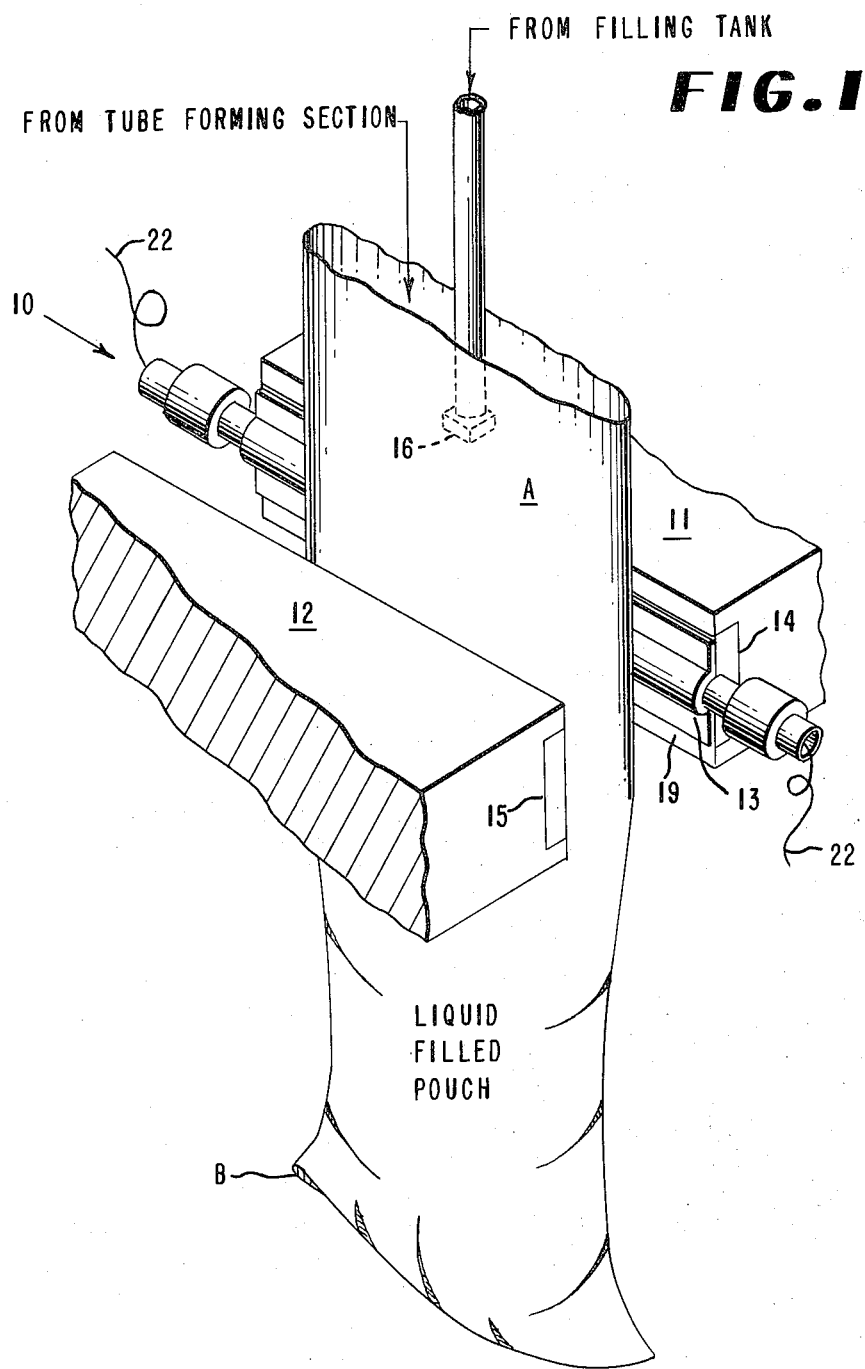
FIG. 1 is a diagrammatic view of an embodiment of the electrical impulse sealer of the present invention mounted in one of a pair of sealing jaws on a form-and-fill machine and in use in sealing and separating the adjacent ends of liquid-filled thermoplastic pouches.

In FIG. 1 of the drawings, a portion of a known form-and-fill machine incorporating an embodiment of the present invention is designated generally by the numeral 10. A partially flattened thermoplastic film tube A is shown moving intermittently downward from the plastic tube-forming section (not shown) of the form-andfill machine. The tube A is stopped periodically between sealing jaws 11 and 12, which are adapted to close and to sever the tube A and simultaneously to cross-seal both ends as indicated by B. Sealing jaw 11 is water-cooled. An electrical impulse sealer 13 is mounted in sealing jaw 11. An electrical insulating, heat-conducting material 14 separates impulse sealer 13 from sealing jaw 11. A pad 15 of rubber or other flexible back-up material is mounted in the face of sealing jaw 12. The impulse sealer 13 and the pad 15 may be prevented from sticking to the film by application of a layer of fiber glass reinforced polytetrafluoroethylene tape or other polytetrafluoroethylene material. A liquid filling station 16 is provided within tube A above the sealing jaws 11 and 12.

Figure 2:
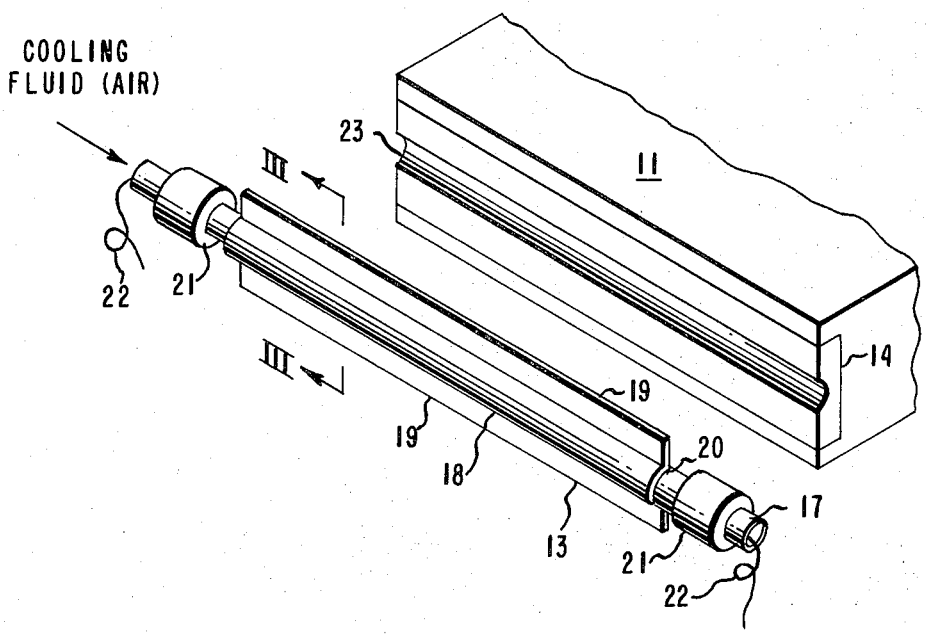
FIG. 2 is an expanded schematic view of the embodiment of FIG. 1 showing the electrical impulse sealer removed from its supporting sealing jaw.

FIG. 2 illustrates impulse sealer 13 and sealing jaw 11 in greater detail. Impuse sealer 13 comprises a hollow metal tube 17 extending at each of its ends beyond sealing jaw 11; a cover 18 extending 180 degrees around and conformed to the surface of the metal tube 17 for the length of the sealing jaw 11 and two fins 19 integrally connected along the length of cover 18 projecting in opposite directions at 180 degrees to each other from the metal tube 17, the cover 18 and the fins 19 being formed from a single strip of metal sheet (see also FIG. 3 for greater detail); and welds 20 connecting the cover 18 at each of its ends to metal tube 17. Two copper sleeves 21 and two electrical connections 22 are provided at the ends of metal tube 17 outside of sealing jaw 11. When impulse sealer 13 is mounted in sealing jaw 11, the portion of the metal tube 17 opposite that enclosed by cover 18 occupies groove 23 in the electrical insulating, heat-conducting material 14 in the face of sealing jaw 11.

During operation, a continuous stream of cooling air or other suitable fluid is fed through metal tube 17 of electrical impulse sealer 13. To commence operation, the thermoplastic tube A from the plastic tube-forming section of the form-and-fill machine is moved downward a preset distance. The sealings jaws 11 and 12 are then closed pressing the layers of film of tube A between the impulse sealer 13 and pad 15 in sealing jaw 12. An electrical impulse fed through electrical connections 22 heats the impulse sealer 13 which cuts through tube A and seals the two layers together above and below the cut-off line. The copper sleeves 21 have little electrical resistance and hence present heat build-up in the ends of metal tube 17 outside of the sealing jaws 11 during the electrical impulse. The sealing jaws 11 and 12 remain closed for a brief cooling period during which a predetermined quantity of liquid is fed into tube A from filling station 16. The sealing jaws 11 and 12 are then opened and the weight of the liquid is supported by seal B. The thermoplastic tube A is again moved downward the preset distance and the above procedure repeated to provide liquid-filled thermoplastic pouches.

The cutting and sealing of the thermoplastic tube A takes place on the cover 18 of the impulse sealer 13. The addition of fins 19 to impulse sealer 13 surprisingly allows the ends of the thermoplastic tube to be sealed when the tube contains a liquid having a low thermal conductivity. It may be that the fins 19, which are not heated to as high a temperature as the cover 18 during the electrical impulse, aid in the cooling of the seals during the brief cooling period by conducting heat from the cover 18 into the electrical insulating, heat-conducting material 14 in the water-cooled sealing jaw 11.

The metal tube 17 may conveniently be a stainless steel tube having an outside diameter of 0.08 inch and a wall thickness of 0.01 inch. However, tubes of a nickel-iron-chromium alloy (available under the trademark Nichrome ®) and of chromium-aluminum-cobalt-iron alloys (such as those available from Ferro Enamels (Canada) Ltd. under the trademarks Kanthal "A," ® Kanthal "D," ® and Kanthal "DR" ®) having diameters in the range of 0.040 inch to 0.100 inch and wall thicknesses in the range of 0.010 inch to 0.020 inch may also be used.

The strip of metal sheet for the cover 18 and the fins 19 may conveniently be a 0.5-inch-wide by 0.003 inch-thick strip of Nichrome ®. However, metal strips of the other materials listed above for the metal tube having a width in the range of 0.10 inch to 0.625 inch and a thickness in the range of 0.0015 inch to 0.0060 inch may also be used.

Several variations of the electrical impulse sealers of the present invention may be obvious to one skilled in the art. Examples of such variations are the following:

(1) The cover 18 may extend from 120 degrees to 240 degrees around the surface of the metal tube 17 instead of 180 degrees and the fins 19 need not extend radially from the tube at 180 degrees to each other. The fins may extend at 180 degrees to each other such that the angle subtended by the cover in front of the fins is in the range of 120 degrees to 240 degrees;

(2) The cover may be eliminated and the two fins each having a thickness no greater than one-third of the wall thickness of the tube may be integrally connected to the tube along the length of the sealing jaw.

Layers of various thicknesses of thermoplastic film may be sealed and simultaneously cut through by the impulse sealer of the present invention. However, the preferred thickness of the film is in the range of 2 mils (0.002 inch) to 6 mils (0.006 inch). The thermoplastic film may be of any type that is capable of being simultaneously sealed and cut through by an impulse sealer. A list of suitable materials would include films of:

conventional and linear polyethylene;
blends of polyethylene with elastomers;
blends of polypropylene;
ethylene vinyl acetate copolymers;
copolymers of ethylene and other α-olefins;
polyvinyl chloride; and
laminated film structures.

The following data are presented in illustration of one embodiment of the present invention.

Tests were carried out to package ethylene glycol in 3-mil- (0.003 inch) thick polyethylene film pouches using a liquid form-and-fill machine equipped in turn with each of the following types of electrical impulse sealers for severing and simultaneously sealing the adjacent ends of the pouches:

(1) A conventional solid wire impulse sealer;
(2) A conventional air-cooled, hollow wire impulse sealer; and
(3) The embodiment of the impulse sealer of the present invention shown in FIGS. 1, 2 and 3 of the drawings.

EXAMPLE I

Several pouches were filled with ethylene glycol on the form-and-fill machine equipped with a conventional solid wire impulse sealer. The bottom seal of each pouch either stretched and leaked or broke open when the pouch was subjected to a very slight shock. Microscopic examination of the bottom seal indicated that a distinct narrowing of the film adjacent the seal had occurred.

EXAMPLE II

Several pouches were filled with ethylene glycol on the form-and-fill machine equipped with a conventional air-cooled hollow wire impulse sealer. The bottom seal of each pouch either stretched and leaked or broke open when the pouch was subjected to a slight shock. Microscopic examination of the bottom seal indicated that narrowing of the film adjacent the seal had occurred, but that the narrowing was less severe than that observed in Example I.

EXAMPLE III

Figure 3:
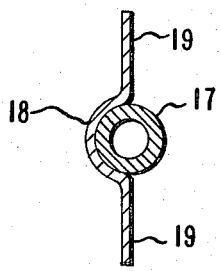
FIG. 3 is an enlarged vertical section viewed in the direction of arrows III—III of FIG. 2.

Several pouches were filled with ethylene glycol on the form-and-fill machine equipped with the impulse sealer shown in FIGS. 1, 2 and 3 of the drawings. The seals on these pouches were as strong as those on pouches filled with water and made on the same form-and-fill machine using the same grade and thickness of polyethylene film. These pouches of ethylene glycol were packaged in corrugated cartons, loaded on pallets and subjected to a shipping test. No seal leaks occurred during the shipping test. Microscopic examination of the bottom seals of these pouches indicated that very little narrowing of the film adjacent the seal had occurred and that the seals were slightly wider than those examined in Examples I and II.

I claim:

1. In an apparatus for sealing and simultaneously cutting through at least two layers of thermoplastic film moving intermittently in one plane, the apparatus including a pair of sealing jaws and means for closing the jaws, the improvement of an electrical impulse sealer mounted in one of the jaws comprising:

a hollow metal tube extending beyond each end of the sealing jaw and adapted to convey a cooling fluid, two metal fins connected to the tube along the length of the sealing jaw, the fins projecting in opposite directions from the tube and being in substantially the same plane as the layers of film, the thickness of the fins being less than one-third of the wall thickness of the tube, the tube and the fins adapted to contact one of the layers of film when the sealing jaws are closed.

2. The apparatus of claim 1 wherein the cover and fins are protected by a layer of polytetrafluoroethylene material.

3. The apparatus of claim 1 wherein the two fins are integrally formed with a cover from a single strip of sheet metal, the cover extending from 120 degrees to 240 degrees around and conformed to the surface of the tube, the cover being connected to the surface of the tube and adapted to contact one of the layers of film when the sealing jaws are closed.

4. The apparatus of claim 3 wherein the cover is connected to the surface of the tube at the cover ends corresponding to the ends of the sealing jaw.

5. The apparatus of claim 4 wherein the two fins project radially from the tube.

6. The apparatus of claim 5 wherein the metal tube is a stainless steel tube having an outside diameter of 0.08 inch and a wall thickness of 0.01 inch and the metal strip from which the two fins and cover are formed is an 0.5-inch-wide by 0.003-inch-thick strip of nickel-iron-chromium alloy.

References Cited
UNITED STATES PATENTS

| | | | |
|---|---|---|---|
| 2,466,735 | 4/1949 | Piazze | 156—498 |
| 2,621,704 | 12/1952 | Langer | 156—583 |
| 2,796,914 | 6/1957 | Park | 156—583 |

DOUGLAS J. DRUMMOND, Primary Examiner

U.S. Cl. X.R.

156—583